(12) United States Patent
Ohki et al.

(10) Patent No.: US 6,830,123 B2
(45) Date of Patent: Dec. 14, 2004

(54) VEHICLE DRIVING POSITION ADJUSTING DEVICE

(75) Inventors: Katsuhito Ohki, Toyota (JP); Masaki Mori, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 222 days.

(21) Appl. No.: 09/956,078

(22) Filed: Sep. 20, 2001

(65) Prior Publication Data

US 2002/0033297 A1 Mar. 21, 2002

(30) Foreign Application Priority Data

Sep. 21, 2000 (JP) ........................................ 2000-287099

(51) Int. Cl.[7] ............................................... B62D 1/02
(52) U.S. Cl. ........................ 180/326; 180/289; 701/49
(58) Field of Search ................................ 180/281, 286, 180/289, 334, 329, 330, 326; 701/49

(56) References Cited

U.S. PATENT DOCUMENTS

| | | | | |
|---|---|---|---|---|
| 4,204,255 A | | 5/1980 | Cremer | |
| 4,707,788 A | * | 11/1987 | Tashiro et al. | ................. 701/49 |
| 4,900,079 A | * | 2/1990 | Obara et al. | ................... 296/64 |
| 5,670,853 A | | 9/1997 | Bauer | |
| 5,812,399 A | * | 9/1998 | Judic et al. | .................... 701/49 |
| 6,064,932 A | * | 5/2000 | Fran.cedilla.ois | ............ 701/49 |
| 6,282,475 B1 | * | 8/2001 | Washington | ................. 701/49 |
| 6,293,584 B1 | * | 9/2001 | Levine | ......................... 451/56 |
| 6,450,530 B1 | * | 9/2002 | Frasher et al. | .............. 280/735 |

* cited by examiner

Primary Examiner—Paul N. Dickson
Assistant Examiner—Toan C To
(74) Attorney, Agent, or Firm—Finnegan, Henderson, Farabow, Garrett & Dunner, LLP

(57) ABSTRACT

A vehicle driving position adjusting device which adjusts an optimum driving position of a driver by moving the seat and the pedal to positions which are adapted to a standard physique of the driver. When the reclining position of the seat is within the driving region while the vehicle is parked and the driver operates the standard key, the seat control device and the pedal control device move the seat and the pedal respectively to the return point on the standard physique characteristic curve which is adapted to a plurality of standard physiques. When the driver manually moves the position of the seat, the pedal control device automatically adjusts the position of the pedal based on the standard physique characteristic curve.

14 Claims, 8 Drawing Sheets

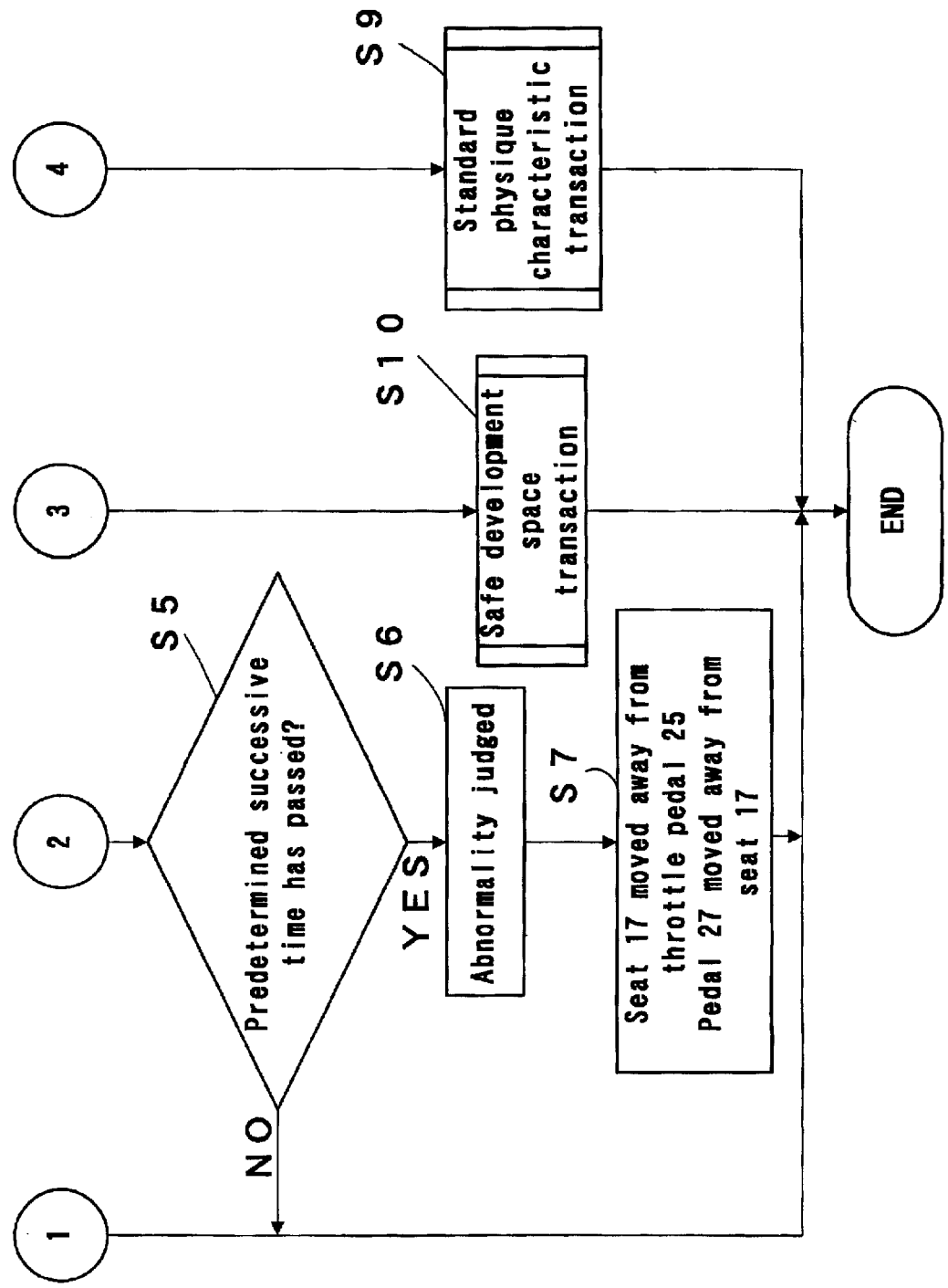

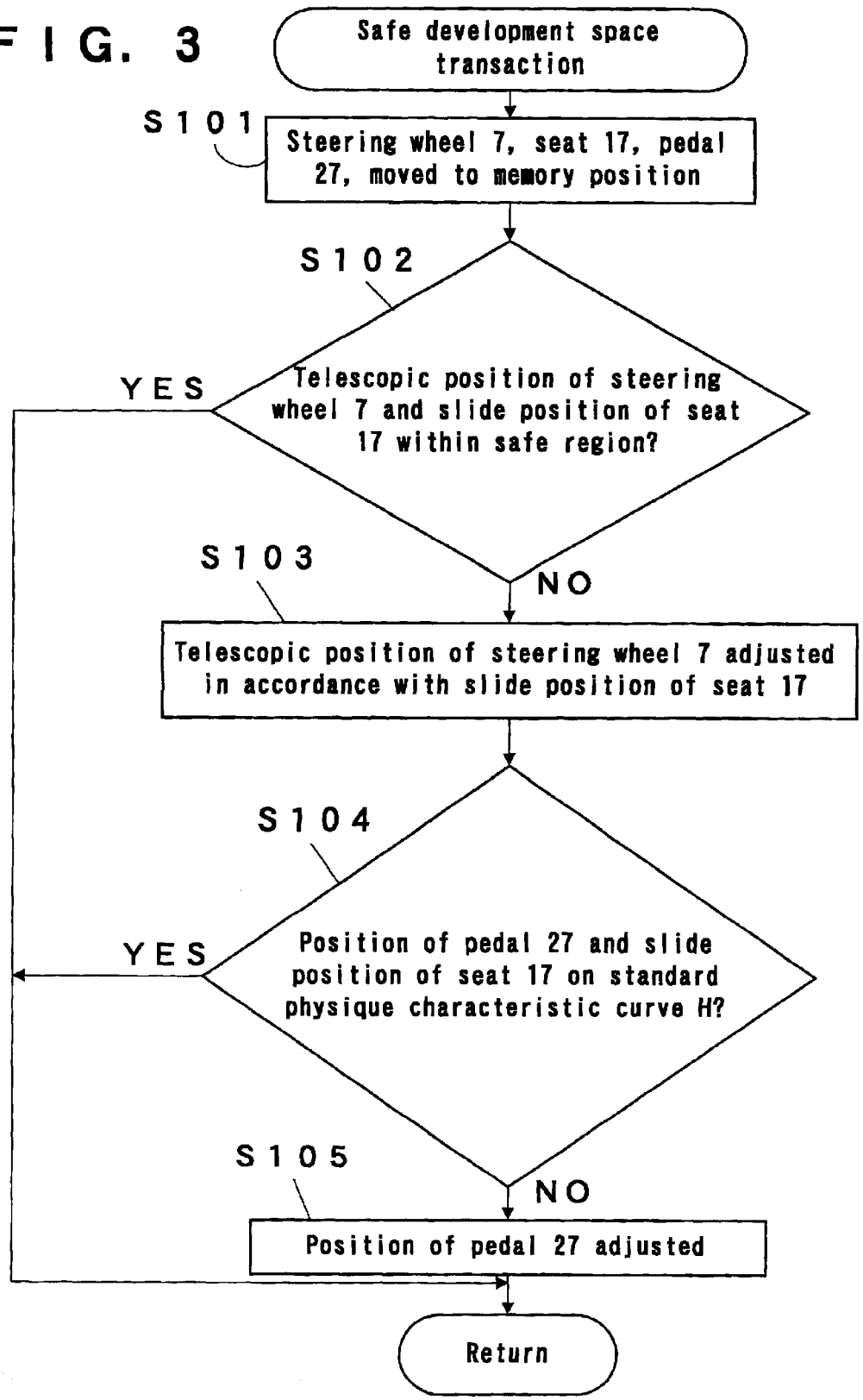

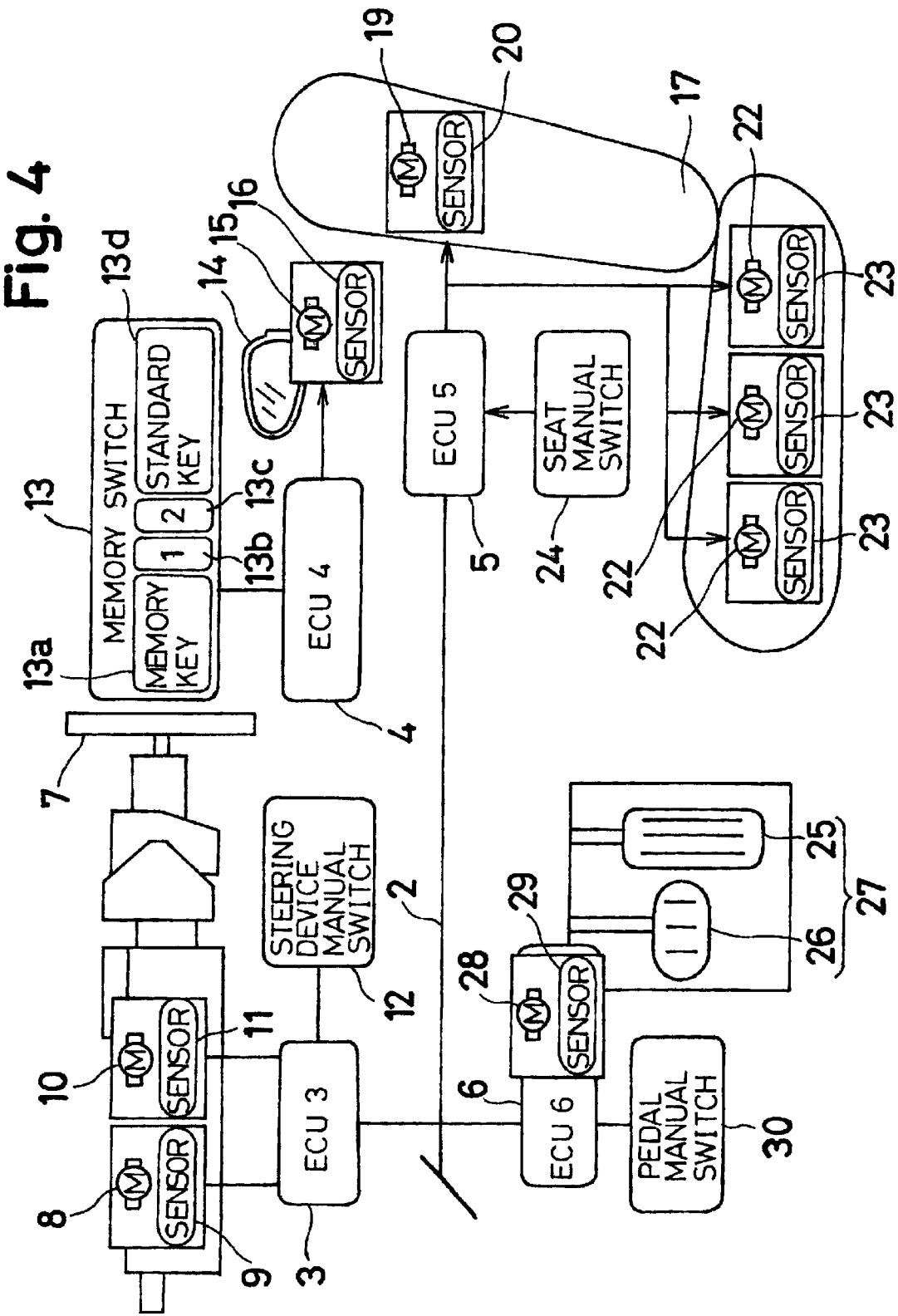

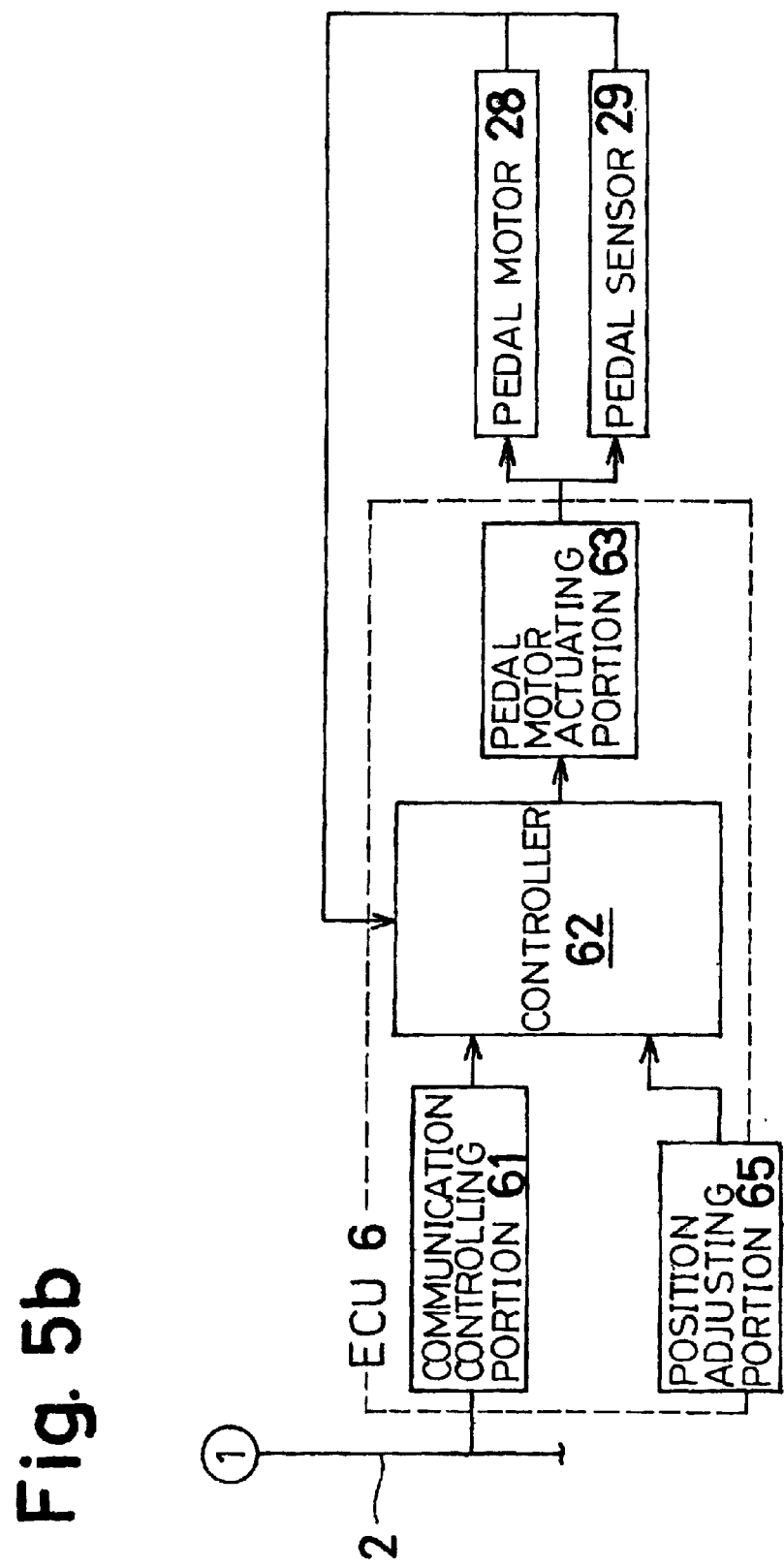

VEHICLE DRIVING POSITION ADJUSTING DEVICE

This application is based on and claims priority under 35 U.S.C. §119 from Japanese Application No. 2000-287099 filed on Sep. 21, 2000, the entire content of which is incorporated herein by reference.

FIELD OF THE INVENTION

This invention generally relates to a vehicle driving position adjusting device. More particularly, the present invention pertains to a vehicle driving position adjusting device for adjusting positions of a steering wheel, a seat, a pedal, and other devices which are related to a driver's driving position.

BACKGROUND OF THE INVENTION

In known vehicles, positions of a steering wheel, a seat, and a mirror, respectively, are memorized in order to be restored to their original position after being moved. In such vehicles, a particular driver can easily restore an optimum driving position for himself/herself if the particular driver memorizes and restores the respective positions of the steering wheel, the seat, and the mirror as his/her optimum driving position after another driver has rearranged the respective positions of the steering wheel, the seat, and the mirror.

In recent years, due to the development of control technology for adjusting the positions of devices which are related to a driver's operation such as a throttle pedal and a brake pedal, a position of the pedals can be included in the driver's optimum driving position which can be memorized and restored by the particular driver.

However, when the pedal position can be adjusted, the seat position and the pedal position come to have a two-dimensional relationship in which a standardized position is indefinite. In this case, the seat position and the pedal position usually cannot be used as a standard when adjusting an optimum driving position for another driver. This is rather inconvenient to the other driver.

In the known vehicles, the driver typically does not consider leaving a space for an airbag deploying from the steering wheel when adjusting the seat to an optimum driving position for the driver. Thus, even at the optimum driving position of the driver, if a distance between the steering wheel position and the seat position is too close, the space for deploying the airbag becomes too narrow. The driver is insufficiently protected when the distance between the steering wheel and the seat becomes too close as a result of driver's positioning of the seat to achieve the optimum driving position, using the known devices.

In another known air bag system, a complex and expensive controlling system is used to control the amount of inflation gas for the air bag depending on the distance between the steering wheel position and the seat position for the safe airbag deployment.

In the known vehicles, irrespective of keeping an optimum driving position of the driver, the driver occasionally may rest or sleep by increasing a reclining angle of the seat backrest from the driving position while the car is parked. While asleep, the driver may step on the throttle pedal unconsciously. This is dangerous. Thus, it would be beneficial to separate the throttle pedal from the driver while the driver is reclined and resting or asleep, in order to avoid an accident.

SUMMARY OF THE INVENTION

To achieve these and other objects of the invention, a vehicle driving position adjusting device is provided. A seat control means detects a seat position and moves the seat. A pedal control means detects a pedal position and moves the pedal device. Positional relationship means indicates a positional relationship between the seat and the pedal as a standard physical characteristic curve adapted to a plurality of standard human physiques. The seat control means and the pedal control means move the seat and the pedal respectively to a return point based on a selected standard physique characteristic curve.

According to another aspect of the invention, the vehicle driving position adjusting device includes a steering wheel control means for detecting a position of a steering wheel, a seat control means for detecting a position of a seat and for moving the seat, and an indicating means for indicating a positional relationship between the steering wheel and the seat as a safe characteristic curve and formed to be adapted to a safe deployment space of an airbag deployed from the steering wheel. When it is judged that the safe deployment space of the airbag cannot be ensured according to a relative positions between the steering wheel and the seat, the steering wheel control means moves the steering wheel or the seat control means moves the seat based on the safe characteristic curve.

According to still another aspect of the invention, the vehicle driving position adjusting device includes a seat control means for detecting a reclining angle of a backrest of a seat and for moving the seat and a pedal control means for moving a throttle pedal. When it is judged that the seat is not at a driving posture judging from the reclining angle of the backrest of the seat and when it is judged that an engine rotates more than a predetermined successive time at an engine rpm greater than a predetermined value, the pedal control means moves the throttle pedal away from the seat or the seat control means moves the seat away from the throttle pedal.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 3 is a subroutine flowchart for showing an operation of the driving position adjusting device for the vehicle according to the preferred embodiment of the present invention;

FIG. 4 is a schematic of the vehicle driving position adjusting device according to the preferred embodiment of the present invention;

DETAILED DESCRIPTION OF THE PREFERRED EMBODIMENT

Figure 1A:
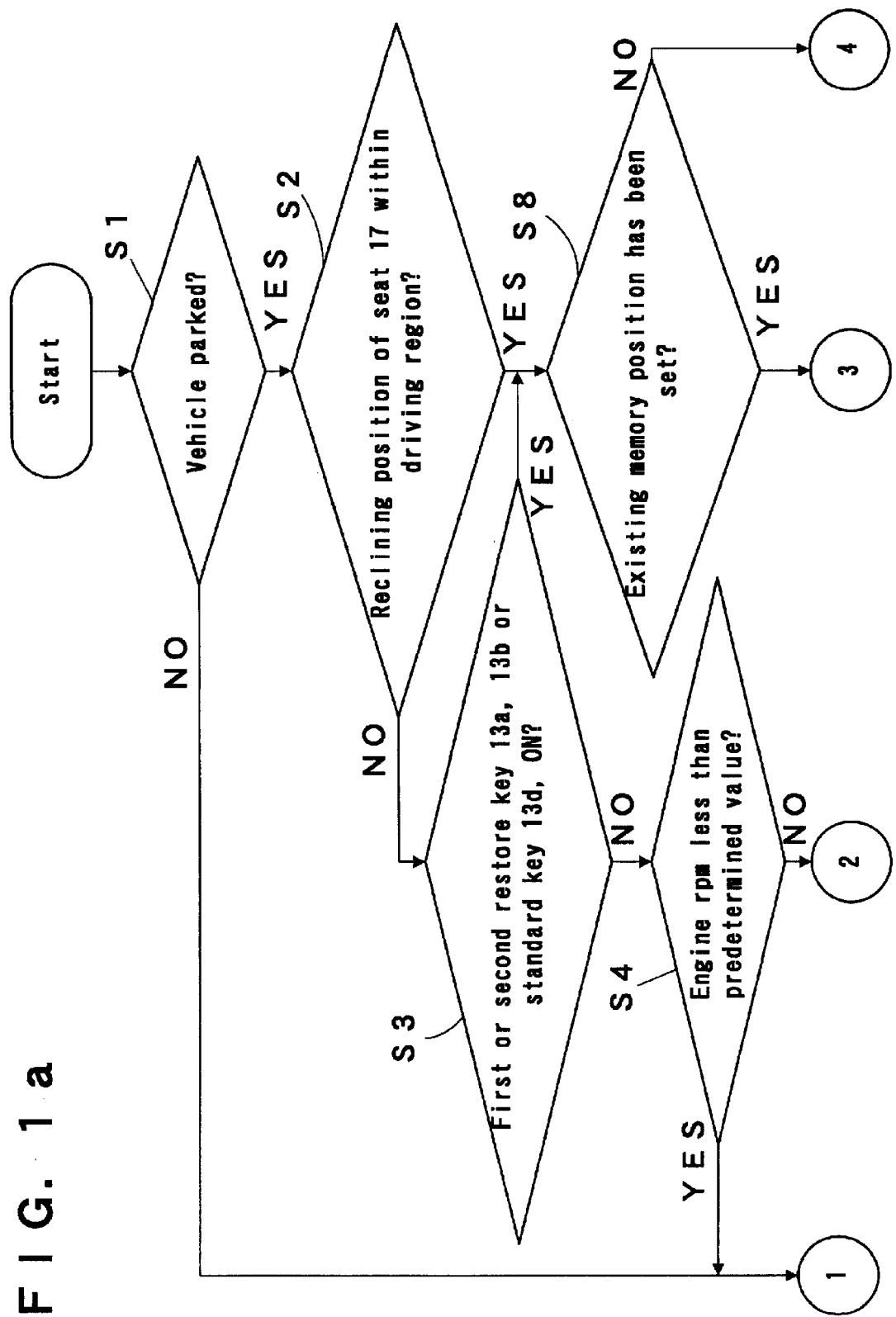
FIG. 1 is a main routine flowchart showing an operation of a driving position adjusting device for a vehicle according to a preferred embodiment of the present invention.

A presently preferred embodiment of a vehicle driving position adjusting device according to the present invention will be explained referring to FIGS. 1-8.

As shown in FIG. 4, a driving position adjusting device 1 includes an internal LAN 2 connected to an ECU 3, an ECU 4, an ECU 5, and an ECU 6. The internal LAN 2 is also connected with an engine ECU (not shown).

The steering wheel ECU 3 is connected with a tilt motor 8, tilt sensor 9, a telescopic motor 10, telescopic sensor 11, and a steering wheel manual switch 12. The tilt motor 8 moves the steering wheel 7 in the upward and downward directions. The telescopic motor 10 moves the steering wheel 7 in the fore and aft (forward and backward) directions. The tilt sensor 9 and the telescopic sensor 11 detect a position of the steering wheel 7. The steering wheel manual switch 12 is for manually moving the steering wheel 7. The tilt motor 8, the tilt sensor 9, the telescopic motor 10, and the telescopic sensor 11 are disposed in the steering wheel 7. A steering device includes the tilt motor 8, the tilt sensor 9, the telescopic motor 10, the telescopic sensor 11 and the steering wheel 7.

The driver seat side door ECU 4 is connected with a memory switch 13, a mirror motor 15, and a mirror sensor 16. The memory switch 13 is provided on a driver seat side door (not shown). The mirror motor 15 and the mirror sensor 16 are disposed in a mirror 14. The memory switch 13 includes a memory key 13a, a first restore key 13b, a second restore key 13c, and a standard key 13d.

The memory key 13a memorizes a first memory position and a second memory position, which are predetermined by a driver, in the driver seat side door ECU 4. In the first and the second memory positions, respective positions of the steering wheel 7, the positions of the mirror 14, the seat 17, and pedals 27 are memorized. The first restore key 13b is for restoring the first memory position. The second restore key 13c is for restoring the second memory position. The standard key 13d is for returning the steering wheel 7 to a return point Q1 which will be explained later.

The seat ECU 5 is connected with a reclining motor 19, a reclining sensor 20, a slide motor 22, a slide sensor 23, and a seat manual switch 24. The reclining motor 19, the reclining sensor 20, the slide motor 22, the slide sensor 23, and the seat manual switch 24 are disposed in the seat 17. The reclining motor 19 is for reclining a backrest of the seat 17. The slide motor 22 moves the seat 17 in fore and aft directions. The reclining sensor 20 detects the reclining position of the seat 17. The slide sensor 23 detects the slide position of the seat 17. The seat manual switch 24 manually moves the seat 17.

The pedal ECU 6 is connected with a pedal motor 28, a pedal sensor 29, and a pedal manual switch 30. The pedal motor 28 and the pedal sensor 29 are provided on the pedals 27 (i.e., a throttle pedal 25 and a brake pedal 26). The pedal motor 28 moves the pedals 27 in the fore and aft directions. The pedal sensor 29 detects the position of the pedals 27. The pedal manual switch 30 manually moves the pedals 27.

The driving position adjusting device 1 of the vehicle wired in the forgoing manner controls the positions of the steering wheel 7, the seat 17, and the pedals 25, 26 with a circuit structure as follows.

Figure 5A:
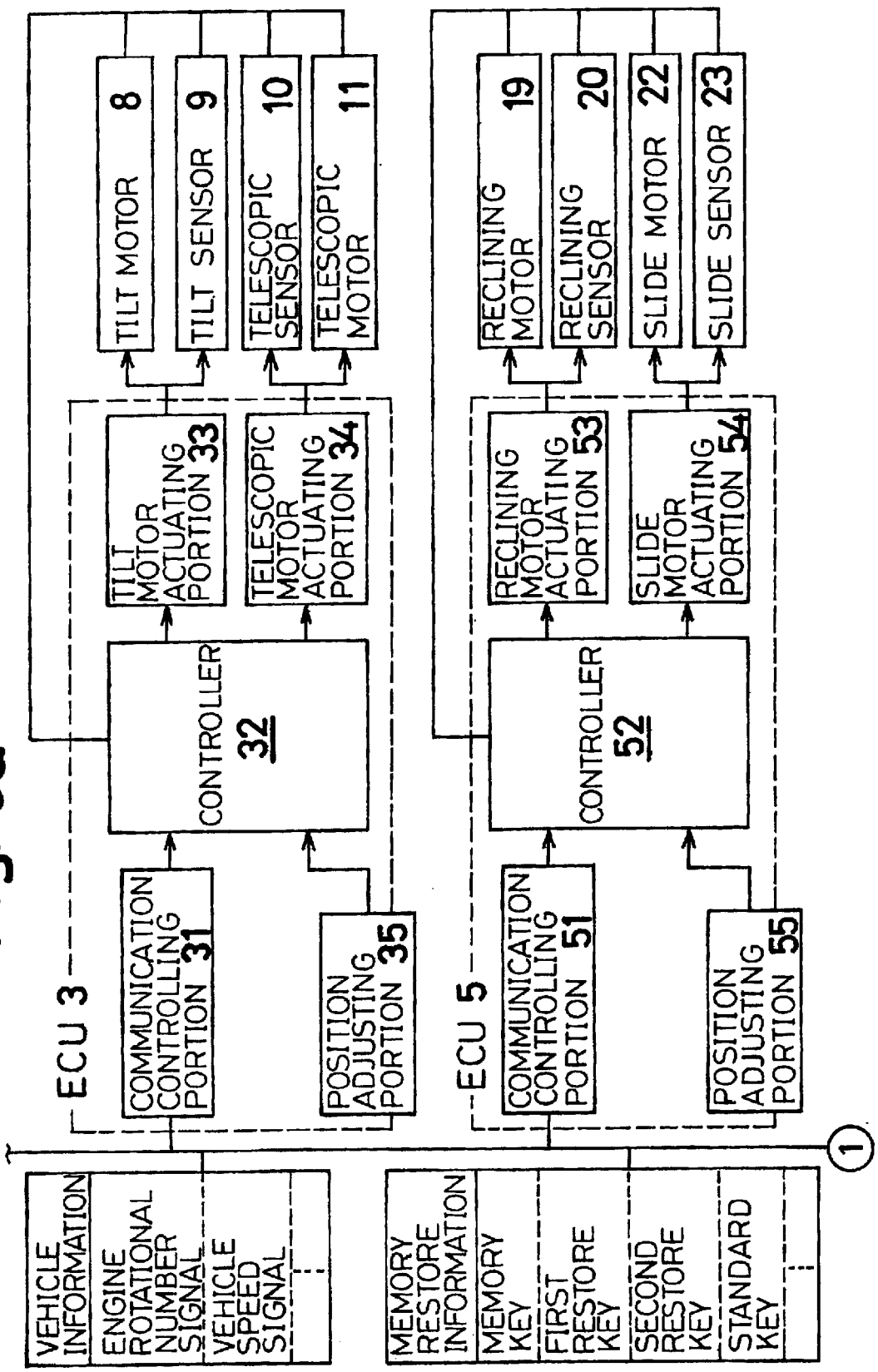
FIG. 5 is a block diagram of the vehicle driving position adjusting device according to the preferred embodiment of the present invention.

As shown in FIG. 5, the steering wheel ECU 3 is connected to the internal LAN 2 via a communication controlling portion 31. The communication controlling portion 31 is connected with a controller 32. The controller 32 is connected with a tilt motor actuating portion 33, a telescopic motor actuating portion 34, and a position adjusting portion 35. The tilt motor actuating portion 33 actuates the tilt motor 8 and the tilt sensor 9. The telescopic motor actuating portion 34 actuates the telescopic motor 10 and the telescopic sensor 11. The function of the position adjusting portion 35 is included in the steering wheel manual switch 12.

A steering wheel controlling means includes the steering wheel ECU 3 (including the communication controlling portion 31, the controller 32, the tilt motor actuating portion 33, the telescopic motor actuating portion 34, and the position adjusting portion 35), the tilt motor 8, the tilt sensor 9, the telescopic motor 10, and the telescopic sensor 11.

The seat ECU 5 is connected to the internal LAN 2 via a communication controlling portion 51. The communication controlling portion 51 is connected with a controller 52. The controller 52 is connected with a reclining motor actuating portion 53, a slide motor actuating portion 54, and a position adjusting portion 55. The reclining motor actuating portion 53 actuates the reclining motor 19 and the reclining sensor 20. The slide motor actuating portion actuates the slide motor 22 and the slide sensor 23. The function of the position adjusting portion 55 is included in the seat manual switch 24.

A seat control means includes a seat ECU 5 (including the communication controlling portion 51, the controller 52, the reclining motor actuating portion 53, the slide motor actuating portion 54, and the position adjusting portion 55), the reclining motor 19, the reclining sensor 20, the slide motor 22, and the slide sensor 23.

The pedal ECU 6 is connected with the internal LAN 2 via a communication controlling portion 61. The communication controlling portion 61 is connected with a controller 62. The controller 62 is connected with a pedal motor actuating portion 63 and a position adjusting portion 65. The pedal motor actuating portion 63 actuates the pedal motor 28 and the pedal sensor 29. The function of the position adjusting portion 65 is included in the pedal manual switch 30.

A pedal control means includes the pedal ECU 6 (including the communication controlling portion 61, the controller 62, the pedal motor actuating portion 63, and the position adjusting portion 65), the pedal motor 28, and the pedal sensor 29.

Figure 6:
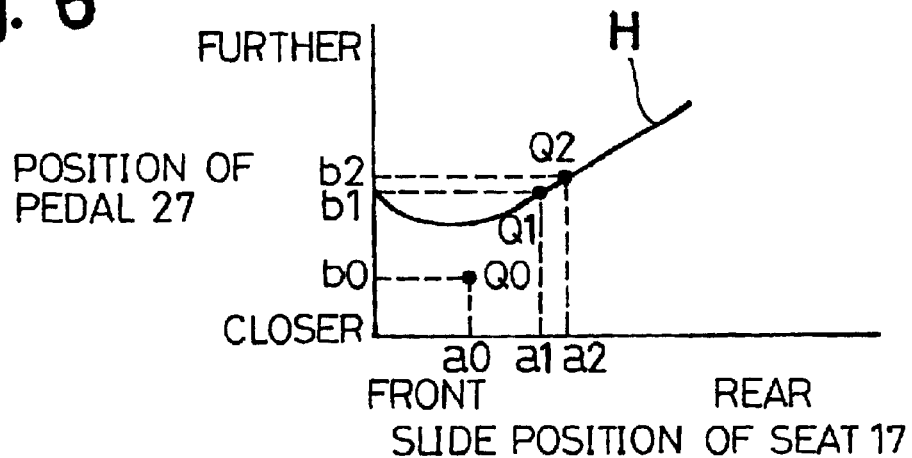
FIG. 6 is a graph depicting a relationship between a sliding position of a seat and a pedal position and shows a standard physique characteristic curve formed adapted to a plurality of standard human physiques.
Figure 7:
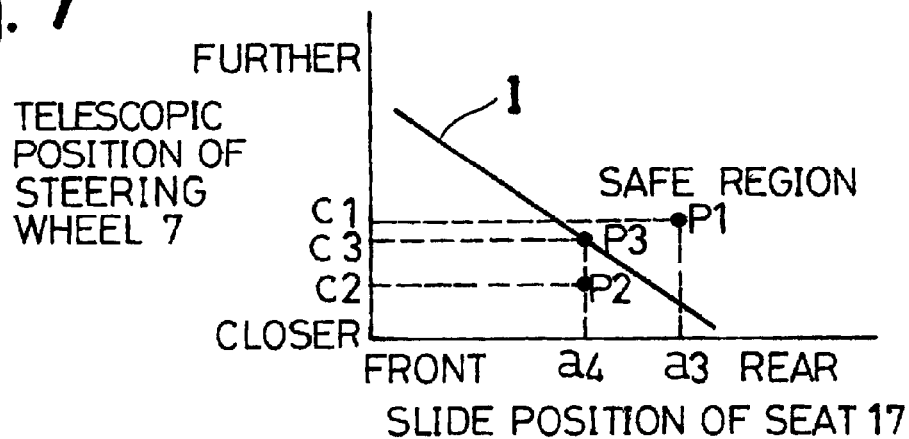
FIG. 7 is a graph depicting a relationship between a telescopic position of a steering wheel and the sliding position of the seat and shows a safety characteristic curve formed adapted to a safe development space of an airbag deployed from the steering wheel.
Figure 8:
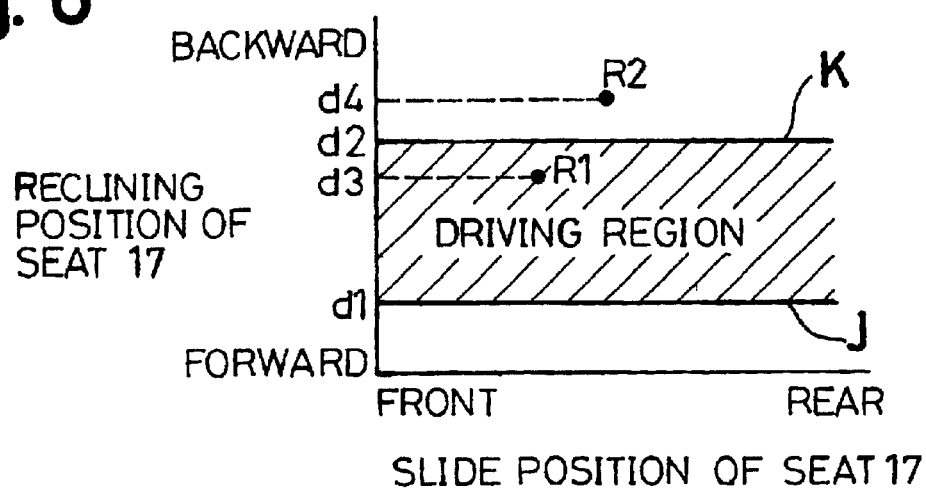
FIG. 8 is a graph depicting a relationship between the sliding position of the seat and a reclining angle of a backrest and shows a posture characteristic curve formed for observing an appropriate driving posture.

The controllers 32, 52, and 62 of the steering wheel ECU 3, the seat ECU 5, and the pedal ECU 6 memorize a standard physique characteristic curve H shown in FIG. 6, a safety characteristic curve I of FIG. 7, and posture characteristic curves J and K shown in FIG. 8.

The standard physique characteristic curve H of FIG. 6 shows a standard positional relationship between the slide position of the seat 17 and the position of the pedal 27, which is formed to be adapted to a plurality of standard human physiques.

The safety characteristic curve I shows the relationship between the telescopic position of the steering wheel 7 and the slide position of the seat 17, which is formed in order to ensure a space for safely deploying an airbag from the steering wheel 7. The upper portion of the safety characteristic curve I corresponds to a safe region in which a safe deploying space for the deploying airbag can be ensured. In this case, the safe deploying space corresponds to a space in which the airbag is deployed for protecting a driver when the vehicle is in a collision.

The posture characteristic curves J and K of FIG. 8 show the relationship between the slide position of the seat 17 and the reclining position of the seat 17, formed for observing appropriate driving posture of the driver. The region surrounded by the posture characteristic curve J, which shows a minimum, reclined position d1 of the reclining position, and the posture characteristic curve K, which shows a maximum reclined position d2 of the reclining position, define a driving region in which it is judged that the driver has a proper driving posture.

Figure 2:
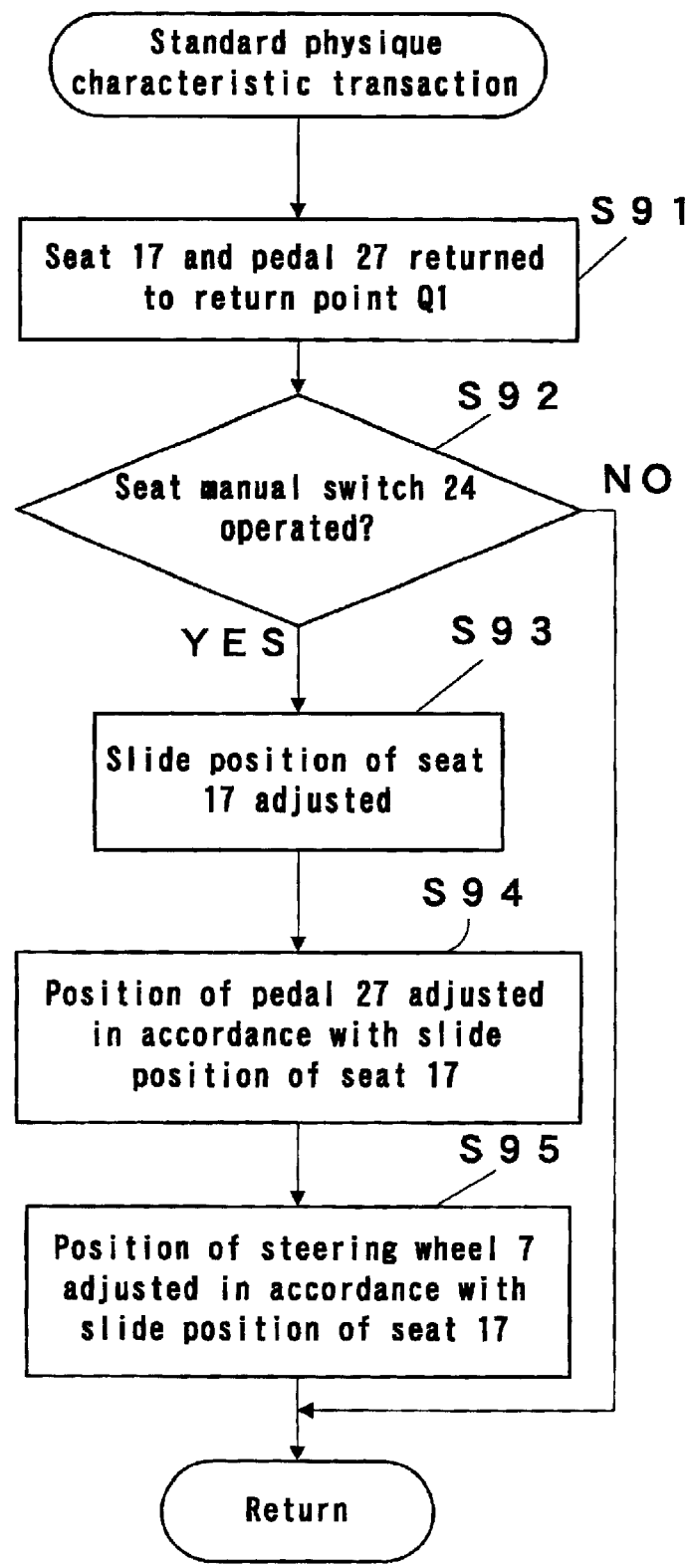
FIG. 2 is a subroutine flowchart for showing an operation of the driving position adjusting device for the vehicle according to the preferred embodiment of the present invention.

The driving position adjusting device 1 having the foregoing circuit structure adjusts the positions of the steering wheel 7, the seat 17, and the pedal 27 by carrying out a transaction as shown in FIGS. 1-3.

As shown in FIG. 1, in step S1, it is judged whether a vehicle is parked, based on a vehicle speed signal (a speed signal of 0 km/h indicates the vehicle is parked) transmitted from the engine ECU. When the vehicle speed is not 0 km/h, is it judged that the vehicle is not parked (i.e., S1: NO), and the transaction is ended without adjusting the driving position.

When the vehicle speed is 0 km/h, the system judges that the vehicle is parked (i.e., S1: YES), the transaction is advanced to Step S2. In step S2, it is judged whether the reclining position of the seat 17 is within the driving region based on the posture characteristic curves J and K. When it is judged that the reclining position of the seat 17 is within the driving region, the transaction is advanced to S8. When the reclining position of the seat 17 is not within the driving region, the transaction is advanced to S3.

In practice, as shown in FIG. 8, when the driving position is R1, the seat ECU 5 judges that the position d3 of the reclining position of the seat 17 is within the driving region (i.e., S2: YES), the transaction is advanced to S8. When the driving position is R2, the seat ECU judges that the position d4 of the reclining position of the seat 17 is not within the driving region (i.e., S2: NO), the step is forward to S3.

Accordingly, as shown in FIG. 8, when it is judged that the reclining position of the seat 17 is not within the driving region (i.e., S2: NO), the transaction is advanced to S3, thus it is judged whether the first restore key 13b, the second restore key 13c, or the standard key 13d is ON.

When the driver turns on either one of the first and the second restore keys 13b, 13c or the standard key 13d (i.e., S3: YES), the transaction is advanced to S8. When the driver does not turn on either one of the first or the second restore keys 13b, 13c or the standard key 13d (i.e., S3: NO), the transaction is advanced to S4 where the seat ECU 5 judges whether the engine rpm is less than a predetermined value based on an engine rotational number signal transmitted from the engine ECU.

When it is judged that the engine rpm is less than the predetermined value (i.e., S4: YES), the transaction is ended without adjusting the driving position. On the other hand, when the seat ECU judges that the engine rpm is not less than the predetermined value (i.e., S4: NO), the transaction is advanced to S5 where it is judged whether a predetermined successive time has passed.

When the successive predetermined time has not passed (i.e., S5: NO), the transaction is ended without adjusting the driving position. On the other hand, when the successive predetermined time has passed (i.e., S5: YES), the transaction advances to Step S6. Then, the transaction advances to Step S7 after the abnormal condition of the vehicle is judged by the seat ECU 5. In step S7, the seat 17 is moved away from the throttle pedal 25 and the pedal 27 is moved away from the seat 17 simultaneously.

Accordingly, even if the resting or sleeping driver unconsciously attempts to step on the throttle pedal 25, the distance between the seat 17 and the throttle pedal 25 is sufficiently for to prevent the foot of the driver from reaching the throttle pedal 25. Thus, undesired pedal operation can be avoided.

When it is judged that the reclining position of the seat 17 is within the driving region in step S2 (i.e., S2: YES), the transaction is advanced to step S8 where it is judged whether an existing memory position has been set. In this case, the existing memory position corresponds to the first memory position which is restored by operating the first restore key 14b and the second memory position which is restored by operating the second restore key 13c. Whether the existing memory position has been set is judged by the occurrence of the operation of the first or second restore keys 13b, 13c.

When it is judged that the existing memory position has not been set (i.e., S8: NO), the transaction is advanced to a standard physique characteristic transaction of step S9. That is, as shown in FIG. 2, in step S91, the seat ECU and the pedal ECU 6 return the seat 17 and the pedal 27 to the return point Q1 of FIG. 6. The location of Q1 on the curve H is predetermined by the user's selected position. A plurality of locations can be selected depending on user's physique.

As shown in FIG. 6, when the current driving position is located at Q0, that is when the slide position of the seat 17 is located at a0 and the pedal 27 is positioned at b0, the seat ECU 5 and the pedal ECU 6 automatically move the seat 17 and the pedal 27. Thus the slide position of the seat 17 is moved to return position a1 and the pedal 27 is moved to a return position b1 to return the driving position to the return point Q1.

In step S92, it is judged whether the seat manual switch 24 is operated. When it is judged that the seat manual switch 24 is not operated (i.e., S92: NO), the transaction is returned to the main flowchart and the transaction of the standard physique characteristic transaction is ended. On the other hand, when it is judged that the seat manual switch 24 is operated (i.e., S9: YES), the driver adjusts the slide position of the seat 17 in step S93 and the transaction is advanced to step S94 to adjust the position of the pedal 27 in accordance with the slide position of the seat 17.

In practice, when the driver operates the seat manual switch 24 to manually move the seat 17 to the favorable position for the driver, as shown in FIG. 6, the seat 17 moves from the return position a1 of the slide position to the position a2 of the slide position. The seat ECU transmits a seat position detecting signal to the internal LAN 2 for informing that the seat 17 is positioned at the position a2 of the slide position. Then, the pedal ECU 6 receives the seat position detecting signal, obtains a position b2 of the pedal 27 corresponding to the position a2 of the slide position based on the standard physique characteristic curve H, and moves the position of the pedal 27 from the return position b1 to the position b2.

Accordingly, when the seat 17 is moved from the return position a1 of the slide position or the position a2 of the slide position in accordance with the movement of the seat 17 by the driver's manual operation, the pedal 27 is moved from the return position b1 to the position b2. Thus the positions of the seat 17 and the pedal 2 are automatically adjusted from the return position Q1 to a Q2 which suits the respective driver's actual physique.

In step S95, the telescopic position of the steering wheel 7 is adjusted in accordance with the position a4 of the slide position of the seat 17 based on the safety characteristic curve I shown in FIG. 7. Accordingly, telescopic position of the steering wheel 7 can be automatically adjusted in accordance with the position a4 of the slide position of the seat 17 in order to ensure the safe developing space of the airbag.

When the driver sets existing memory position in step S8 (i.e., S8: YES), the transaction is advanced to a safe development space transaction of step S10. That is, as shown in FIG. 3, in step S101, the steering wheel ECU 3, the seat ECU 5, and the pedal ECU 6 move the steering wheel 7, the seat 17, and the pedal 27 to the first memory position or the second memory position respectively.

In step S102, the steering wheel ECU 3 and the seat ECU 5 judge whether the slide position of the seat 17 and the telescopic position of the steering wheel 7 are within the safe region. When the slide position of the seat 17 and the telescopic position of the steering wheel 7 are within the safe region (i.e., S102: YES), the transaction is returned to the main flowchart and the transaction of the safe development space transaction is ended. On the other hand, when the slide position of the seat 17 and the telescopic position of the steering wheel 7 are not within the safe region (i.e., S102: NO), the transaction is advanced to step S103. Then, the telescopic position of the steering wheel 7 is adjusted in accordance with the slide position of the seat 17.

In practice, when the driver turns on the first restore key 13b, as shown in FIG. 7, the seat 17 is moved to a predetermined position a3 of the slide position and the steering wheel 7 is moved to a predetermined position c1 of the telescopic position. Thus, the positions of the seat 17 and the steering wheel 7 are located at P1 which is within the safe region (i.e., S102: YES). Then, the transaction is returned to the main flowchart and the transaction of the safe development space transaction is ended.

On the other hand, when the driver turns on the second restore key 13c, as shown in FIG. 7, the seat 17 is moved to a predetermined position a4 of the slide position and the steering wheel 7 is moved to a predetermined position c2 of the telescopic position. Thus, the positions of the seat 17 and the steering wheel 7 are located at position P2 which is out of the safe region (i.e., S102: NO). In this case, the steering ECU 3 obtains a position c3 of the steering wheel 7 corresponding to the predetermined position a4 of the slide position based on the safe characteristic curve I of FIG. 7 and moves the position of the steering wheel 7 from the predetermined position c2 to the position c3. Accordingly, the steering wheel 7 and the seat 17 are moved from the position P2 which is out of the safe region to a position P3 which is in the safe region.

In the foregoing, even when the driver adjusts the positions of the seat 17 and the steering wheel 7 to the position P2 which is out of the safe region by setting to the second memory position without considering the space of the airbag deployed from the steering wheel by turning on the second restore key 13c, the position of the steering wheel 7 is retracted from the predetermined position c2 to the position c3 and the deployment space for the airbag is widened. Thus, the diver can be sufficiently protected by the airbag in case of a collision.

In step S104, it is judged whether the position of the pedal 27 and the slide position of the seat 17 are on the standard physique characteristic curve H. When it is judged that the position of the pedal 27 and the slide position of the seat 17 are on the standard physique characteristic curve H (i.e., S104: YES), the transaction is returned to the main flowchart and the transaction of the safe deployment space transaction is ended. On the other hand, when it is judged that the position of the pedal 27 and the slide position of the seat 17 are not on the standard physique characteristic curve H (i.e., S104: NO), the transaction is advanced to step S105 to perform the position adjustment of the pedal 27 in the manner like the aforementioned standard physique characteristic transaction. Then the transaction is returned to the main flowchart and the transaction of the safe development space transaction is ended.

If the seat manual switch 24 or the pedal manual switch 30 are provided separately in the driving position adjusting device 1 of the vehicle according to this embodiment, the position adjustment of the seat 17 by the seat control means including the seat ECU 5 and the position adjustment of the pedal 27 by the pedal control means including the pedal ECU 6 come to be performed individually without mutual influence. In this case, however, the relationship between the position of the seat 17 and the position of the pedal 27 are extended two-dimensionally, in which the adjusting standard position becomes indefinite.

Considering the above problem, in the driving position adjusting device 1 of the vehicle in this embodiment, as shown in FIG. 6, the standard physique characteristic curve H is formed to be adapted to a plurality of standard physiques under the two-dimensional relationship between the position of the seat 17 and the position of the pedal 27. Thus, the seat 17 and the pedal 27 are moved to the return point Q1 on the standard physique characteristic curve H by the seat control means and the pedal control means respectively.

Accordingly, when the driver adjusts the optimum driving position, as shown in S91 of FIG. 2, the seat 17 and the pedal 27 are moved to the return position Q1 on the standard physique characteristic curve H formed applying to the plurality of the standard physiques by the seat control means and the pedal control means respectively, the pedal 27 and the seat 17 are moved to the positions which are adapted to the driver's standard physique.

Further, in the vehicle driving position adjusting device 1 according to this embodiment, when the seat 17 is moved as shown in step S93 of FIG. 2 after the seat 17 and the pedal 27 are moved by the seat control means and the pedal control means respectively to the return point Q1 on the standard physique characteristic curve H, by moving the pedal 27 by the pedal control means based on the standard physique characteristic curve H (S94 of FIG. 2), as shown in FIG. 6, the pedal 27 and the seat 17 can be moved to the position Q2 which is adapted to the actual physique of the driver. Accordingly, the adjustment of the diver's optimum driving position can be performed easily.

According to the vehicle driving position adjusting device 1 of this embodiment, the position adjustment of the steering wheel 7 by the steering wheel control means including the steering wheel ECU 3 and the position adjustment of the seat 17 by the seat control means can be performed individually without mutual influence by using the steering wheel manual switch 12 or the seat manual switch 24 even when memorizing the first memory position or the second memory position by the memory key 13a. Thus, even if the distance between the position of the steering wheel 7 and the position of the seat 17 becomes too close to ensure the safe deployment space for performing safe deployment of the airbag, the steering wheel 7 is moved by the steering wheel control means based on the safe characteristic curve I which is formed to be adapted to the safe deployment space of the airbag deployed from the steering wheel 7.

In the driving position adjusting device 1 of the vehicle of this embodiment, when it is judged that the position of the steering wheel 7 and the position of the seat 17 are not within the safe region (i.e., S102: NO), as shown in S103 of FIG. 3, the steering wheel 7 is moved by the steering wheel control means based on the safe characteristic curve formed to be adapted to the safe deployment space of the airbag. Thus, the telescopic position of the steering wheel 7 is moved from the position c2 to the position c3 and the distance between the position of the steering wheel 7 and the position of the seat 17 can be adjusted to be adapted to the safe deployment space of the airbag. This can protect the driver in case of a vehicle collision.

This function for keeping safe distance of the airbag deployment can be achieved not only when memorizing the first memory position or the second memory position by the memory key 13*a* but also when adjusting the positions of the seat 17 by the seat control means and the steering wheel 7 by the steering wheel control means using the steering wheel manual switch 12 or the seat manual switch 24.

In the driving position adjusting device 1 of the vehicle of the embodiment, when it is judged that the seat 17 is not suitable for driving posture from the reclining angle of the backrest of the seat 17 (i.e., S2: NO) and also it is judged that the engine is consecutively rotated more than predetermined time at engine rpm greater than the predetermined value (i.e., S4: NO) while the vehicle is parked (i.e., S1: YES), the throttle pedal 25 is moved away from the seat 17 by the pedal control means and the seat 17 is moved away from the throttle pedal 25 by the seat control means.

Accordingly, when the vehicle is parked, the distance between the throttle pedal 25 and the driver can be increased by moving the throttle pedal 25 and the seat 17, and thus the driver can be protected.

The driving position adjusting device of the present invention is not limited to the foregoing embodiment and variations can be made and still remain within the scope of the invention. For instance, in the vehicle driving position adjusting device 1 of the foregoing embodiment, when the seat 17 is moved (S93 of FIG. 2) after the seat control means moves the seat 17 and the pedal control means moves the pedal 27 to the return position Q1 on the standard physique characteristic curve H (S91 of FIG. 2), the pedal control means moves the pedal 27 based on the standard physique characteristic curve H (S94 of FIG. 2), the pedal 27 and the seat 17 are moved to the position Q2 which is adapted to the actual physique of the driver (FIG. 6).

However, even when the pedal 27 is moved first, instead of the seat 17 at S93, after the seat 17 and the pedal 27 are moved by the seat control means and the pedal control means respectively to the return position Q1 on the standard physique characteristic curve H (S91 of FIG. 2), the seat 17 is moved automatically by the seat control means based on the standard physique characteristic curve H. Thus, the pedal 27 and the seat 17 are moved to the position Q2 which is adapted to the actual physique of the driver, which makes adjustment of the driver's optimum driving position a simple operation.

Further, although the pedal 27 and the seat 17 are moved to the position Q2 to adjust the respective positions in accordance with the actual physique of the driver in the foregoing, the position may reasonably fit to the most of drivers because the position Q1 is adapted to the standard physique. Thus, by only performing the adjustment to the position Q1 can provide a comfortable driving position for the driver. This makes the adjustment operation simple.

In the vehicle driving position adjusting device 1 according to the preferred embodiment, the seat 17 and the pedal 27 are moved to the return position Q1 on the standard physique characteristic curve H (S91 of FIG. 2) based on the standard physique characteristic curve H of FIG. 6 showing the positional relationship between the seat 17 and the pedal 27. By adding the positional relationship between the mirror 14 and the steering wheel 7 referring to the standard physique characteristic curve H of FIG. 6, the mirror 14 and the steering wheel 7 can be also moved to the return point Q1 on the standard physique characteristic curve H along with the seat 17 and the pedal 27.

The driving position adjusting device can be also applied to adjust the positions of a transmission shift lever, a seat belt anchor, or any other devices related to driver's operation.

Further, after moving the mirror 14 and the steering wheel 7 to return point Q1 along with the seat 17 and the pedals 27, or any devices mentioned above the mirror 14 and the steering wheel 7 can be moved to Q2 which is adapted to the actual driver's physique when moving the positions of the seat 17 and the pedals 27 from return point Q1 to position Q2.

In the driving position adjusting device 1 of the vehicle according to the embodiment, when it is judged that the positions of the steering wheel 7 and the seat 17 are not within the safe region (i.e., S102: NO), the steering wheel 7 is moved by the steering wheel control means based on the safe characteristic curve I of FIG. 7 which is formed to be adapted to the safe deployment space of the airbag (S103).

However, in step S103 of FIG. 3, the distance between the position of the steering wheel 7 and the position of the seat 17 can be adjusted to be adapted to the safe deployment space of the airbag by performing the movement of the seat 17 by the seat control means instead of moving the steering wheel 7 by the steering wheel control means. Thus, the driver is sufficiently protected in case of a collision.

Further, even when movement of the steering wheel 7 by the steering wheel control means and movement of the seat 17 by the seat control means are performed simultaneously, in S103 of FIG. 3, the distance between the position of the steering wheel 7 and the position of the seat 17 can be adjusted to the safe deployment space of the airbag. Thus, the driver can be sufficiently protected in case of a collision.

In the driving position adjusting device 1 of the vehicle according to the preferred embodiment, when it is judged that the seat 17 is not in a suitable driving posture according to the reclining angle of the backrest of the seat 17 (i.e., S2: NO) and it is judged that the engine is successively rotated more than the predetermined time with the engine rpm greater than the predetermined value (i.e., S4: NO) when the vehicle is parked (S1: YES), the pedal control means moves the throttle pedal 25 away from the seat 17 and, simultaneously, the seat control means moves the seat 17 away from the throttle pedal 5 (S7).

However, in S7 of FIG. 1, even when the only throttle pedal 25 is moved away from the seat 17 by the pedal control means or only seat 17 is moved away from the throttle pedal 25 by the seat control means, the throttle pedal 25 is separated from the driver by moving the throttle pedal 25 or seat 17 when the vehicle is parked, under a certain condition such as the seat being reclined over a predetermined angle which securely protects the driver while the vehicle is parked.

The principles, preferred embodiment and mode of operation of the present invention have been described above. However, the invention is not limited to the particular embodiment and mode of operation disclosed. Further, the embodiment described herein is to be regarded as illustrative rather than restrictive. Variations and changes may be made, and equivalents employed, without departing from the spirit or scope of the present invention. Accordingly, it is expressly intended that all such variations, changes and equivalents fall within the spirit and scope of the present invention, as defined in the claims.

What is claimed is:

1. A vehicle driving position adjusting device comprising:
    a control means, for detecting positions of plural devices and for moving the devices; and
    an indicating means for indicating a positional relationship between at least two devices in accordance with a shape of a user's physique selected from a group of standard human physiques,
    wherein the control means move the at least two devices respectively to conform to the shape of the user's physiques;
    wherein said at least two devices comprise at least a first device and a second device and the control means comprises a first control means and a second control means; and
    wherein the first device is moved after moving the second device to conform to the shape of the user's physique by the first control means, and the second control means moves the second device to conform to the shape of the user's physique.

2. A vehicle driving position adjusting device according to claim 1, wherein the first device is a seat and the second device is a pedal.

3. A vehicle driving position adjusting device according to claim 2, wherein said control means comprises a seat control means and a pedal control means; and wherein the seat control means and the pedal control means move the seat and the pedal respectively to conform to the shape of the user's physique.

4. A vehicle driving position device according to claim 2, further comprising a third device, said third device being a steering wheel control means for controlling a position of the steering wheel, said steering wheel control means comprising detecting means for indicating a position of the steering wheel, and indicating means for indicating a positional relationship between the steering wheel and the seat in accordance with a safe characteristic curve adapted to a safe deployment space of an airbag deployable from the steering wheel, wherein when it is judged that the safe deployment space of the airbag cannot be ensured in response to relative positions of the steering wheel and the seat, said steering wheel control means moves the steering wheel, or said seat control means moves the seat based on the safe characteristic curve.

5. A vehicle driving position adjusting device according to claim 1, wherein the first device is a pedal and the second device is a seat.

6. A vehicle driving position adjusting device according to claim 5, wherein said control means comprises a seat control means and a pedal control means; and wherein the seat control means and the pedal control means move the seat and the pedal respectively to conform to the shape of the user's physique.

7. A vehicle driving position adjusting device according to any one of claims 3 or 6, wherein the pedal is moved after moving the seat and the pedal to conform to the shape of the user's physique by the seat control means and the pedal control means, and the seat control means moves the seat to conform to the shape of the user's physique.

8. A vehicle driving position adjusting device according to claim 1, wherein the first device is a mirror and the second device is a seat.

9. A vehicle driving position adjusting device according to claim 8, wherein said control means comprises a mirror control means and a seat control means; and wherein the mirror control means and the seat control means move the mirror and the seat respectively to conform to the shape of the user's physique.

10. A vehicle driving position adjusting device according to claim 1, wherein the first device is a seat and the second device is a mirror.

11. A vehicle driving position adjusting device according to claim 10, wherein said control means comprises a mirror control means and a seat control means; and wherein the mirror control means and the seat control means move the mirror and the seat respectively to conform to the shape of the user's physique.

12. A vehicle driving position adjusting device comprising:
    a seat control means for detecting a position of a seat and for moving the seat;
    a pedal control means for detecting a position of a pedal and for moving the pedal; and
    an indicating means for indicating a positional relationship between the seat and the pedal in accordance with a shape of a user's physique selected from a group of standard human physiques;
    wherein the seat control means and the pedal control means move the seat and the pedal respectively to conform to the shape of the user's physique.

13. A vehicle driving position adjusting device according to claim 12, wherein when the seat is moved after moving the seat and the pedal to the return point on the standard physique characteristic curve by the seat control means and the pedal control means, the pedal control means moves the pedal based on the standard physique characteristic curve.

14. A vehicle driving position adjusting device according to claim 12, wherein the pedal is moved after moving the seat and the pedal to conform to the shape of the user's physique by the seat control means and the pedal control means, the seat control means moving the seat based on the standard physique characteristic curve.

* * * * *